Figure 3:
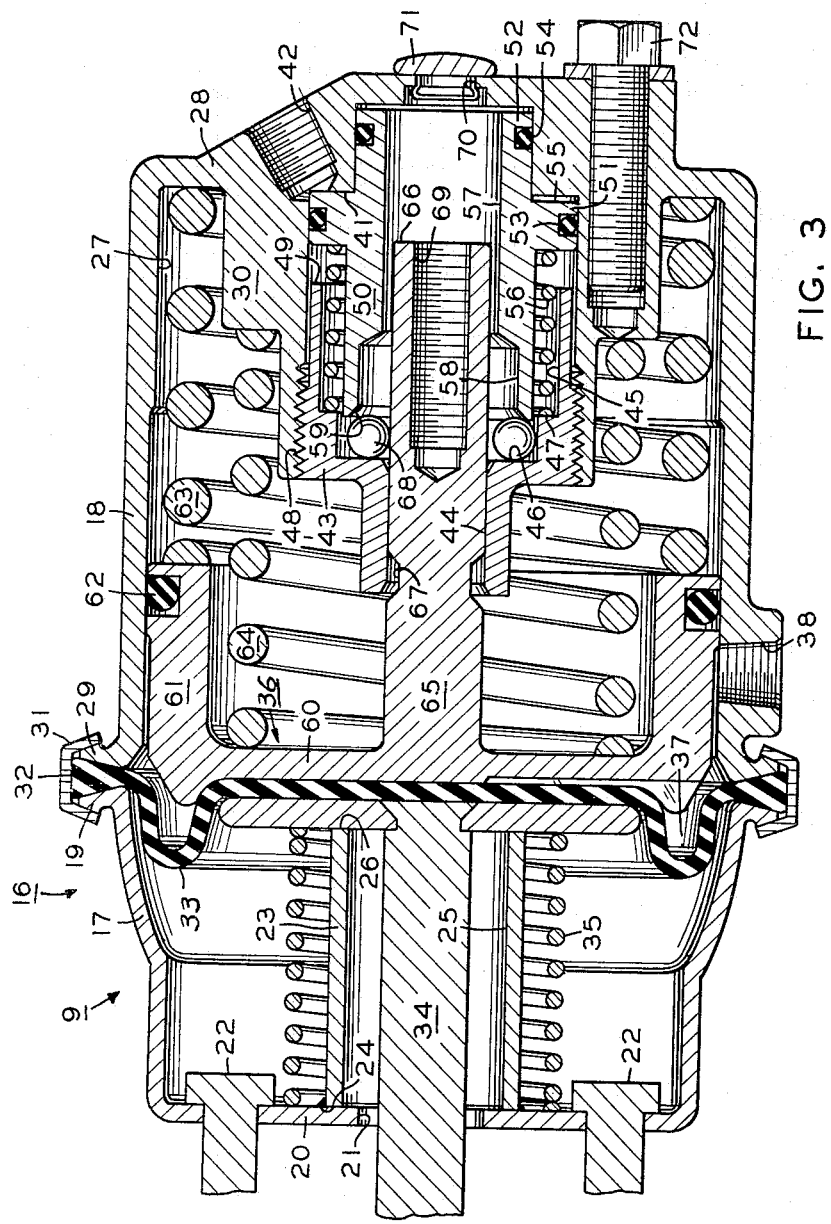

May 18, 1965   O. B. CRUSE   3,183,791
FRICTION DEVICE OPERATING MECHANISM
Filed May 31, 1963   2 Sheets-Sheet 1
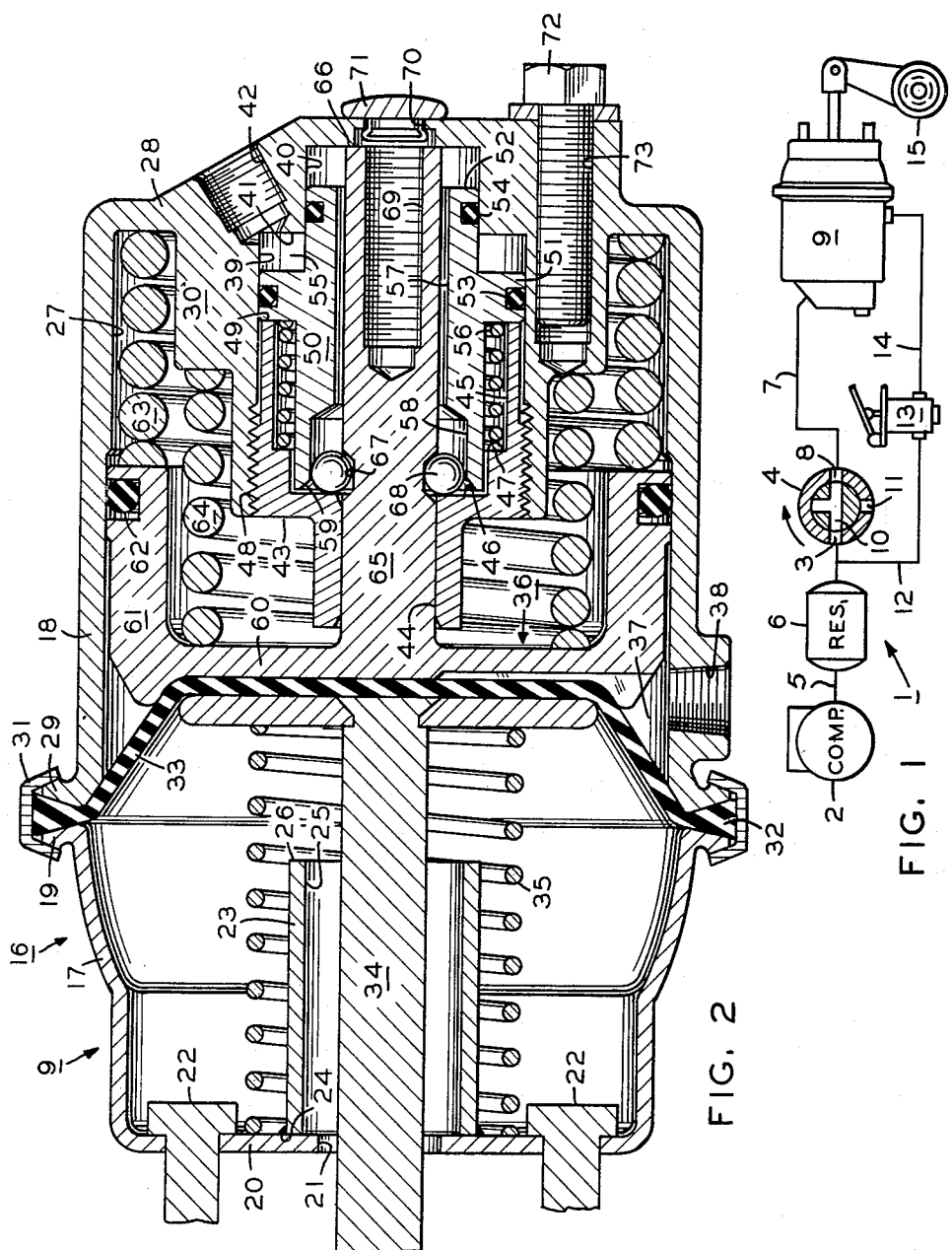
INVENTOR
OLIVER B. CRUSE
BY *Joseph E. Papin*

United States Patent Office 3,183,791
Patented May 18, 1965

3,183,791
FRICTION DEVICE OPERATING MECHANISM
Oliver B. Cruse, Florissant, Mo., assignor to Wagner Electric Corporation, St. Louis, Mo., a corporation of Delaware
Filed May 31, 1963, Ser. No. 284,720
10 Claims. (Cl. 92—24)

This invention relates to friction device operating mechanisms and in particular to those having mechanically retained, resilient emergency actuating means therein.

In the past, many friction device operating mechanisms have been provided with a service portion having service actuating means therein for energizing a vehicle friction device in response to metered fluid pressure from the vehicle fluid pressure system and also with a separate emergency portion having resilient emergency actuating means therein for automatically energizing said friction device when the fluid pressure in said system was reduced below a predetermined value. One of the undesirable features of such past friction device operating mechanisms was that the service and emergency actuating means were mounted in separate chambers or portions which necessitated expensively cast housings, and another undesirable feature was that the resilient emergency actuating means "creeped" toward a friction device operating position when the system fluid pressure was slowly reduced to a value less than the predetermined value wherein the vehicle was unknowingly operated for extended periods of time with the friction device energized in a "drag" condition, i.e., not energized enough to effect appreciable vehicle deceleration.

An object of the present invention is to provide a friction device operating mechanism which overcomes the abovementioned undesirable features.

Another object of the present invention is to provide a friction device operating mechanism having service and emergency actuating means for friction device energizing purposes wherein the forces transmitted by said service and emergency actuating means are non-additive.

And still another object of the present invention is to provide a friction device operating mechanism having means therein to positively restrain the emergency actuating means against friction device energizing movement until the fluid pressure of the vehicle fluid pressure system is reduced to a predetermined amount.

These and other objects and advantages will become apparent hereinafter.

Briefly, the invention embodies a source of fluid pressure, service actuating means for energizing a friction device in response to metered fluid pressure from said source, resilient emergency actuating means for automatically energizing said friction device when the fluid pressure of said source is less than a predetermined amount, and means for preventing movement of said resilient emergency actuating means to energize said friction device until the fluid pressure of said source is reduced to the predetermined amount.

The invention also consists in the parts and arrangements and combinations of parts hereinafter described and claimed. In the accompanying drawings which form a part of the specification and wherein like numerals refer to like parts wherever they occur:

FIG. 1 is a diagrammatic view of a vehicle friction device actuating system showing a friction device operating mechanism embodying the present invention therein, and FIGS. 2 and 3 are greatly enlarged cross-sectional views of an embodiment showing the friction device operating mechanism of FIG. 1 in its inoperative and operative positions, respectively.

Referring now to FIG. 1 in detail, a friction device actuating system, indicated generally at 1, is provided with fluid pressure generating means, such as compressor 2, which is connected to an inlet 3 of a charging or control valve 4 by a conduit 5, and a fluid pressure storage reservoir 6 is interposed in the conduit 5 providing, in combination with the compressor 2, a source of fluid pressure. Another conduit 7 is interposed between an outlet 8 of the charging valve 4 and the emergency port of a friction device operating mechanism or actuating cylinder 9. The charging valve 4 is provided with passage means 10 connecting the inlet 3 with the outlet 8; however, said charging valve can be rotated clockwise (in the direction of the arrow) positioning said passage means 10 to interrupt pressure fluid communication between said inlet and outlet and to establish pressure fluid communication between said outlet and an exhaust port 11 to vent said outlet to atmosphere. A conduit 12 has one end intersecting the conduit 5 and the other end thereof connecting with the inlet side of an application valve 13, and another conduit or service line 14 is interposed between the outlet or service side of said application valve and the service port of the actuating cylinder 9. To complete the system 1, the push rod of the actuating cylinder 9 is pivotally connected with linkage means or an actuating lever, such as slack adjuster 15, for energizing a friction device (not shown).

The actuator 9, FIG. 2, is provided with a housing, indicated generally at 16, including a cup-shaped end plate 17 and cylinder 18. The end plate 17 is provided with a peripheral flange 19 adjacent the open end thereof and a base wall 20 having a centrally located venting aperture 21 therein. A plurality of mounting studs 22 are fixedly attached to the end wall 20 by suitable means, such as upset welds, for fixed connection with a mounting bracket (not shown) adjacent the friction device. The end wall 20 is provided with a centrally located cylindrical extension 23 which is connected thereto by suitable means, such as weld 24, and said extension is provided with a bore 25 therethrough substantially coaxial with the venting aperture 21 and a free or abutment end 26. The cylinder 18 is provided with a bore 27 therein and an integrally formed end wall or closure member 28 which closes one end of said bore, and a peripheral flange 29 is provided on the cylinder 18 adjacent to the leftward or open end of the bore 27 in opposed relation to the peripheral flange 19 of the end plate 17. The end wall 28 is provided with a centrally disposed integrally formed cylindrical extension or hub 30 which protrudes coaxially into the cylinder bore 27. A conventional clamping band 31 is provided in clamping engagement with the opposed end plate flange 19 and cylinder flange 29 and the compressive force of said clamping engagement serves to clamp a peripheral bead 32 of a diaphragm or service actuating means 33 in sealable abutting engagement between the flanges 19 and 29. A push rod assembly 34 extends coaxially through the venting aperture 21 and the base wall extension bore 25 having an exterior or working end pivotally connected with the slack adjuster 15, as previously mentioned, and an interior end connected by the compressive force of a return spring 35 with the diaphragm 33. The return spring 35 is interposed between the end plate base wall 20 and the push rod 34 serving to normally bias the push rod 34 to an inoperative position wherein the diaphragm 33 is abuttingly engaged between said push rod and emergency piston or resiliently urged means, indicated generally at 36. An expansible service or actuating chamber 37 is formed in the cylinder bore 27 between the diaphragm 33 and the emergency piston 36, and a service port 38 which receives the conduit 14, as previously mentioned, is provided in the cylinder 18 in open pressure fluid communication with the service chamber 37.

The cylindrical hub 30 on the housing end wall 28 is provided with a pair of axially stepped bores 39 and 40 having an annular abutment shoulder or surface 41 therebetween, and a control or emergency port 42 which receives the conduit 7, as previously mentioned, is provided in said end wall intersecting with said shoulder. An abutment or closure member 43 is provided with an axial bore 44 and stepped counterbore 45 having stepped shoulders 46 and 47 therebetween, and said closure member is threadedly received at 48 in the leftward end of the hub bore 39. The rightward or free end 49 of the closure member 43 is provided to limit the movement of a stepped control piston 50 having larger and smaller portions 51 and 42 slidable in the hub bores 39 and 40, and seals 53 and 54 are carried in the peripheral surfaces of said larger and smaller piston portions in sealing engagement with said hub bores. An expansible control or emergency chamber 55 is formed in the hub 30 between the smaller piston portion 52 and hub bore 39 and between the larger piston portion 51 and the hub shoulder 41 in open pressure fluid communication with the control port 42, and a return spring 56 is interposed between the closure member shoulder 47 and said larger piston portion normally urging the control piston 50 rightwardly from an operative position wherein said larger piston portion is abuttingly engaged with the abutment end 49 of the closure member 43 toward an inoperative position wherein said larger piston portion abuts the hub shoulder 41. The control piston 50 is also provided with an axial bore 57 and a counterbore 58 therethrough, and a beveled surface 59 connects the counterbore 58 with the leftward end of said control piston.

The emergency piston 36 is provided with a radially extending head portion 60 which is normally engaged with the diaphragm 33, as previously mentioned, and a peripheral flange 61, which is integrally formed with said piston head portion, is slidable in the cylinder bore 27. A seal 62 is carried in the piston flange 61 in sealing engagement with the cylinder bore 27, and a pair of springs 63 and 64 are biased between said flange and base wall 28 and between the piston head 60 and hub 30, said springs normally resiliently urging the emergency piston 36 leftwardly in a working direction toward an operative position. The piston head 60 is provided with an integrally formed, axial extension 65 which is slidably received in the closure member bore 44 and which extends coaxially through the bore and counterbore 57 and 58 of the control piston 50. The piston extension 65 is provided with a rightward or free end 66 for abutting engagement with the housing end wall 28 to limit the rightward movement of the emergency piston 36 in a non-working direction toward its inoperative position. A peripheral groove 67 is provided in the piston extension 65 near the midportion thereof and normally juxtaposed with the closure member shoulder 46, and the counterbore 58 of the control piston 50 is normally in positioning or abutting engagement with a plurality of displaceable means or bearings 68 to maintain said bearings against radial displacement from said groove. Further, the bearings 68 are also normally positioned in locking or abutting engagement between the piston extension groove 67 and the closure member abutment shoulder 46 to maintain the emergency piston 36 in its inoperative position against the compressive or spring forces of the springs 63, 64 and prevent movement therefore of leftwardly in the working direction.

To complete the description of the actuator 9, an axial threaded bore 69 is provided through the abutment end 66 of the piston extension 65 for emergency release purposes, and an access aperture or opening 70 is provided in the end wall 28 connecting with the hub bore 40 and substantially in axial alignment with the threaded piston extension bore 69. A dust shield 71 is removably secured in the access opening 70 to prevent the entry of foreign particles, and an emergency release stud and bearing washer assembly 72, is removably secured in a threaded bore 73 provided in the housing end wall 28 and hub 30.

In the operation with the component parts of the system 1 and the friction device operating mechanism 9 positioned as shown in FIGS. 1 and 2, assume that normal vehicle operating conditions exist wherein the storage reservoir 6 is charged with fluid pressure from the compressor 2 and wherein the reservoir 6 is connected in open pressure fluid communication with the control chamber 55 via the conduit 5, the inlet 3, passage means 10 and outlet 8 of the charging valve 4, the conduit 7 and the emergency port 42. The fluid pressure so transmitted to the control chamber 55 acts on the effective area of the control piston 50 therein creating a holding or restraining force to bias said piston against the return spring 56 into abutting engagement with the closure member abutment end 49 and to position the control piston counterbore 58 in position maintaining engagement with the bearings 68. In this manner, the bearings 68 are positively positioned in the peripheral groove 67 of the emergency piston extension 65 against displacement, and the locking engagement of said bearings between said groove and the closure member abutment shoulder 46 positively retains the emergency piston 36 in its inoperative position and positively prevents said emergency piston from creeping or moving leftwardly in the work-producing direction toward its operative position in the cylinder bore 27 in response to the spring forces of the emergency springs 63, 64.

If the operator desires to make a normal service application to energize the friction device and effect the vehicle deceleration or a complete stop, the application valve 13 is actuated to meter fluid pressure from the reservoir 6 through conduits 5 and 12, said application valve, the conduit 14 and the service port 38 of the friction device operating mechanism 9 into the service chamber 37. The fluid pressure so established in the service chamber 37 acts on the effective area of the diaphragm 33 creating a service force to move said diaphragm and the push rod 34 leftwardly to an operative position against the compressive force of the return spring 35 thereby actuating the working end of said push rod to rotate the slack adjuster 15 and energize the friction device (not shown) under normal operating conditions. When the application valve 13 is de-actuated, the fluid pressure in the service chamber 37 is exhausted to atmosphere through the service port 38, the conduit 14 and the exhaust port of said application valve thereby eliminating the service force, and the compressive force of the return spring 35 substantially moves the slack adjuster 15, the push rod 34 and the diaphragm 33 to their original inoperative positions.

When the fluid pressure in the reservoir 6 is reduced, but not below the predetermined amount, due to leaks in the system 1, or the like, the fluid pressure in the control chamber 55 is correspondingly reduced thereby reducing the holding force urging the control piston 50 into positioning engagement with the bearings 68; however, as long as the holding force is greater than the compressive force of the return spring 56, the locking engagement of said bearings between the piston extension groove 67 and the closure member abutment shoulder 46 prevents creep or movement of the emergency piston 36 in the work-producing direction toward its operative position in response to the compressive forces of emergency springs 63, 64.

Under emergency conditions when the fluid pressure in the reservoir 6 is reduced below the predetermined amount, the compressive force of the return spring 56, FIG. 2, overcomes the holding force to move the control piston 50 rightwardly into abutting engagement with the shoulder 41 and to move the control piston counterbore 58 rightwardly out of positioning engagement with the bearings 68. With the control piston counterbore 58 displaced from positioning engagement with the bearings 68, the compressive forces of the emergency springs 63, 64 overcome the locking engagement of said bearings to move the emergency piston 36 leftwardly in the work-producing direction in the cylinder bore 27. The piston extension 65 is also moved leftwardly with the emergency piston 36 thereby moving the bearings 68 from the piston extension groove 67 to a displaced position between the stepped counterbore 45 and the peripheral surface of said piston extension and between the closure member shoulder 46 and the control piston beveled end 59. Since the emergency piston 36 is normally engaged with the diaphragm 33, the leftward movement of said emergency piston moves said diaphragm and the push rod 34 leftwardly in the working direction against the compressive force of the return spring 35 to actuate the slack adjuster 15 and energize the friction device under emergency conditions. As shown, the push rod 35 is engaged with the abutment or free end 26 of the base wall extension 23, and this abutment determines the maximum stroke of the diaphragm 33 and emergency piston 36; however, when the slack adjuster 15 is properly adjusted, the push rod 34 will not be moved into engagement with the end wall extension 24.

When the fluid pressure failure of the system 1 has been corrected and fluid pressure in the reservoir 6 is increased to an amount greater than the predetermined amount wherein normal operating conditions are now re-established, the fluid pressure in the control chamber 56 is correspondingly increased to re-establish the magnitude of the holding force. In this manner, the control piston 50 is urged leftwardly against the return spring 56 to urge the leftward or beveled end 59 thereof into abutment with the displaced bearings 68. In order to de-actuate the actuating cylinder 9 and de-energize the friction device, the operator utilizes the re-established fluid pressure to initiate a service application, as previously described hereinbefore. The re-established fluid pressure so applied in the actuating chamber 37 re-establishes the service force which acts to maintain the diaphragm 33, the push rod 34 and the slack adjuster 15 in their operative positions energizing the friction device. The re-established fluid pressure in the actuating chamber 37 also acts on the effective area of the emergency piston 36 therein establishing an opposing force in opposition to the compressive or spring forces of emergency springs 63, 64. When the magnitude of the opposing force overcomes that of the spring forces, the emergency piston 36, the piston extension 65 and components parts associated therewith are moved rightwardly in the cylinder bore 27 to their original inoperative positions against springs 63, 64. This rightward movement moves the free end 66 of the piston extension into abutting engagement with the end wall 28 and repositions the piston extension groove 67 relative to the closure member abutment shoulder 46 to again receive the ball bearings 68. At the same time, the re-established holding force moves the control piston 50 leftwardly to again move the counterbore 58 thereof into positioning engagement with the bearings 68. In this manner, the bearings 68 are forced back to their original positions into the piston extension groove 67, and when the fluid pressure is exhausted from the actuating chamber 37, the compressive force of the springs 63, 64 again urges the emergency piston 36 and component parts associated therewith leftwardly in the working direction; therefore, since the bearings 68 are maintained against displacement from the groove 67 by the control piston 50, the compressive force of the springs 63, 64 acting on said emergency piston 36 re-establishes the locking engagement of the bearings 68 between the groove 67 and the closure member abutment shoulder 46.

Upon the exhaustion of fluid pressure from the actuation chamber 37 at the end of the service application, as previously mentioned, the service and opposing forces are eliminated, and the return spring 35 subsequently returns the push rod 34 and the diaphragm 33 to their original inoperative positions thereby de-energizing the friction device. The locking engagement of the bearings 68 between the piston extension groove 67 and the closure member shoulder 46 once again retains the emergency piston 36 against leftward movement in response to the compressive forcse of springs 63, 64. It should be noted that the service force and the compressive forces of the springs 63, 64 are non-additive since the opposing force acting against the spring forces substantially counteracts or balances said spring forces; therefore, compounding of the emergency spring forces and the service force, which might permanently distort or fracture the push rod 34, the slack adjusters 15 or component parts of the friction device, is obviated.

Of course, the operator may initiate the emergency function of the actuating cylinder 9, if he so desires, by "dynamiting" the system 1. To "dynamite" the system 1, the operator merely rotates the charging valve 4 in a clockwise direction (as shown by the arrow in FIG. 1) to align the passage means 10 between the outlet 8 and the exhaust port 11 thereby exhausting fluid pressure from the control chamber 55 through the emergency port 42 and the conduit 7 and therefrom to atmosphere via said outlet, passage means and exhaust port of the charging valve 4. With the control chamber 55 vented to atmosphere, the emergency conditions again prevail to initiate the emergency function of the actuating cylinder 9, as described hereinbefore, and automatically energize the friction device.

The present actuating cylinder 9 is provided with fluid pressure responsive means, such as the diaphragm 33 and push rod 35, responsive to applied service fluid pressure to normally effect a service application of the friction device, and resiliently urged means, such as the emergency piston 36 and springs 63, 64, are provided to automatically energize the friction device when the fluid pressure in the system 1 is reduced below a predetermined value; however, holding or retaining means, such as bearings 68 and control piston 50, which are operatively interconnected with said resiliently urged means, positively prevents movement thereof toward the friction device energizing position or operative position until the system fluid pressure is reduced to a value less than the predetermined value thereby eliminating "creeping" movement of said resiliently urged means to the operative position as the system fluid pressure is reduced to said predetermined value.

It is now apparent that a novel friction device operating mechanism or actuating cylinder meeting the objects and advantages set out hereinbefore is provided and that changes or modifications to the precise configurations, shapes, or details of the construction set forth in the disclosure by way of illustration may be made by those skilled in the art without departing from the spirit of the invention as defined by the claims which follow.

What I claim is:

1. A friction device operating mechanism comprising a housing, piston means slidable in said housing and having a working end thereon, resilient means normally urging said piston means in a working direction to actuate the working end thereof, said piston means including a portion having groove means therein, abutment means movable in said housing independently thereof and radially displaceable relative to said groove means, said abutment means being normally in abutting engagement between said groove means and housing to prevent movement of said piston means in the working direction, an expansible fluid pressure chamber in said housing, and means responsive to fluid pressure in said chamber above a predetermined amount to maintain said abutment means against radial displacement from said groove means and in abutting engagement between said groove means and housing.

2. A friction device operating mechanism comprising a housing, piston means slidable in said housing and having a working end thereon, resilient means normally urging said piston means in a working direction to actuate the working end thereof, extension means on said housing including an expansible pressure fluid chamber therein, displaceable means normally engaged between said piston means and extension means to prevent movement of said piston means in the working direction, and means normally opposing expansion of said chamber and responsive to fluid pressure therein above a predetermined amount to retain said displaceable means against displacement from engagement between said piston means and extension means.

3. A friction device operating mechanism comprising a housing, piston means slidable in said housing and having a working end thereon, resilient means normally urging said piston means in a working direction to actuate the working end thereof, extension means on said piston means having groove means therein, displaceable means normally positioned in said groove means in locking engagement between said extension means and housing to prevent movement of said piston means in the working direction, an expansible fluid pressure chamber in said housing, and means engaged with said displaceable means and responsive to fluid pressure in said chamber above a predetermined amount to retain said displaceable means against displacement from said groove means.

4. A friction device operating mechanism comprising a housing, piston means slidable in said housing and having a working end thereon, resilient means normally urging said piston means in a working direction to actuate the working end thereof, extension means on said piston means having groove means therein, other extension means on said housing including an expansible fluid pressure chamber therein, displaceable means normally received in said groove means in locking engagement between said first named and other extension means to prevent movement of said piston means in the working direction, and retaining means engaged with said displaceable means and responsive to fluid pressure in said chamber above a predetermined amount to retain said displaceable means against displacement from said groove means and in locking engagement between said first named and other extension means.

5. A friction device operating mechanism comprising a housing, piston means slidable in said housing and having a working end thereon, resilient means normally urging said piston means in a working direction to actuate the working end thereof, extension means on said piston means, other extension means on said housing, an expansible fluid pressure chamber in said other extension means, bearing means for locking engagement between said first named and other extension means, and resiliently urged means normally opposing expansion of said chamber, said resiliently urged means being movable in response to fluid pressure in said chamber above a predetermined amount into engagement with said bearing means to urge said bearing means to a position in locking engagement between said first named and other extension means and prevent movement of said piston means in the working direction, and said resiliently urged means being movable to disengage said displaceable means when the fluid pressure in said chamber is reduced below the predetermined amount to permit movement of said piston means and first named extension means in the working direction relative to said bearing means.

6. A friction device operating mechanism comprising a housing, emergency piston means slidable in said housing and having a working end thereon, extension means on said emergency piston means, groove means in said extension means, hub means on said housing and substantially coaxial with said extension means, said extension means being slidable in said hub means, an abutment wall on said hub means, control piston means slidable in said hub means and defining therewith an expansible fluid pressure chamber, bearing means normally retained in said groove means in displacement preventing engagement with said control piston means when the fluid pressure on said chamber acting on said control piston means is greater than a predetermined value, resilient means for urging said control piston means to a disabled position disengaged from said bearing means when the fluid pressure in said chamber and acting on said control piston means is less than the predetermined value, and other resilient means normally urging said piston means and extension means in a working direction to bias said bearing means into locking engagement between said abutment wall and groove means, the force of said other resilient means being effective to move said piston means in the working direction to actuate the working end thereof and displace said bearing means from locking engagement between said abutment wall and groove means upon movement of said control piston means to its disabled position.

7. A friction device operating mechanism comprising a housing, resiliently urged means movable in said housing and having a working end thereon, displaceable means movable independently of said housing and said resiliently urged means and adapted for locking engagement therebetween to obviate movement of said resiliently urged means in a direction to actuate the working end thereof, and other resiliently urged means having displacement preventing means thereon and movable in said housing to define therewith an expansible fluid pressure chamber, said other resiliently urged means being movable in response to fluid pressure in said chamber in excess of a predetermined value to engage said displacement preventing means with said displaceable means to obviate displacement movement thereof independently of said housing and said first named resiliently urged means and maintain said displaceable means in locking engagement between said first named resiliently urged means and housing.

8. A friction device operating mechanism comprising a cylinder having hub means therein, a bore in said hub means, means connected with said hub means defining an end wall for said bore, piston means slidable in said cylinder and having a working end thereon, extension means on said piston means extending through said end wall into said bore, resilient means urging said piston means in a working direction to actuate the working end thereof, displaceable means for locking engagement between said extension means and end wall to prevent movement of said piston means in the working direction, other piston means slidable in said bore and defining therewith an expansible fluid pressure chamber, and other means on said other piston means for displacement preventing engagement with said displaceable means, said other piston means being movable in response to fluid pressure in said chamber in excess of a predetermined value to a position engaging said other means with said displaceable means to maintain said displaceable means against displacement from locking engagement between said extension means and said end wall.

9. The friction device operating mechanism according to claim 8 comprising groove means in said extension means, said displaceable means being maintained within said groove means against displacement therefrom by said last named means to effect the locking engagement between said extension means and said end wall.

10. A friction device operating mechanism comprising a cylinder having hub means therein including a pair of stepped bores, means connected with said hub means defining an end wall for the larger of said stepped bores, piston means slidable in said cylinder and having a working end thereon, extension means on said piston means extending through said end wall into said stepped bores, resilient means urging said piston means in a working direction to actuate the working end thereof, displaceable means for locking engagement between said extension means and said end wall to obviate movement of said piston means in the working direction, other piston means slidable in said stepped bores and defining with said larger stepped bore an expansible fluid pressure chamber, other resilient means urging said other piston means in a direction to oppose fluid pressure expansion of said chamber, another bore extending through said other piston means substantially coaxial with said extension means, and other means on said other piston means for displacement preventing engagement with said displaceable means, said other piston means being movable against said other resilient means in response to fluid pressure in said chamber in excess of a predetermined value to a position in said larger stepped bore engaging said other means with said displaceable means to maintain said displaceable means against displacement from locking engagement between said extension means and said end wall.

No references cited.

RICHARD B. WILKINSON, *Primary Examiner.*